June 5, 1923.
P. E. TWISS
1,457,759
CONTROLLING MECHANISM FOR ELECTRIC VEHICLES AND THE LIKE
Filed April 4, 1921
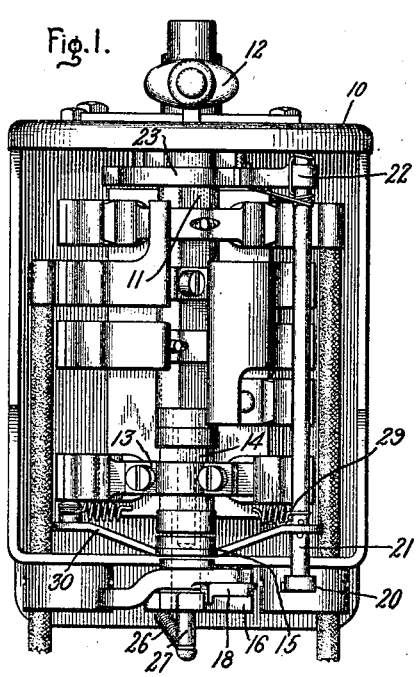
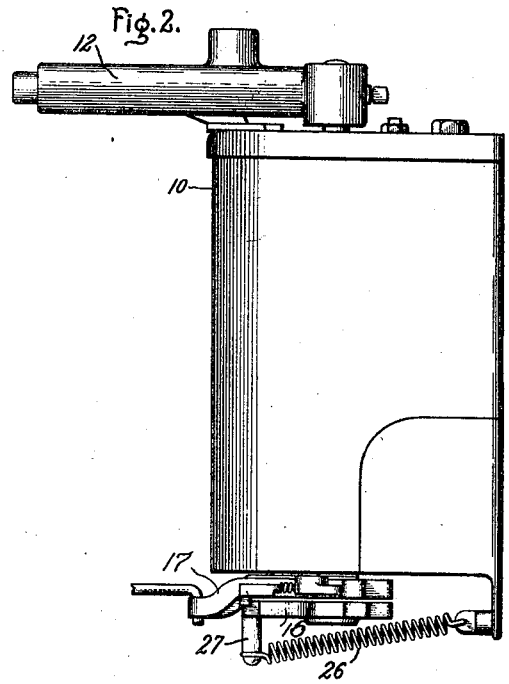
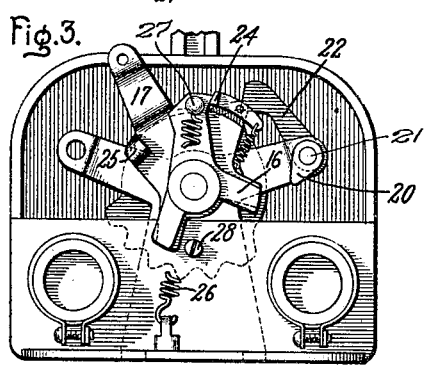
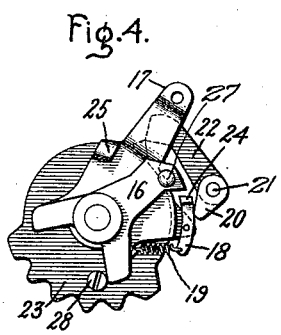
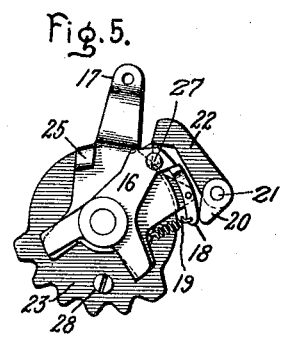
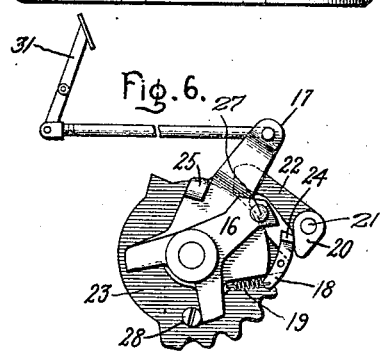
Inventor:
Paul E. Twiss,
by Albert G. Davis
His Attorney Patented June 5, 1923.

1,457,759

UNITED STATES PATENT OFFICE.

PAUL E. TWISS, OF SWAMPSCOTT, MASSACHUSETTS, ASSIGNOR TO GENERAL ELECTRIC COMPANY, A CORPORATION OF NEW YORK.

CONTROLLING MECHANISM FOR ELECTRIC VEHICLES AND THE LIKE.

Application filed April 4, 1921. Serial No. 458,321.

*To all whom it may concern:*

Be it known that I, PAUL E. TWISS, a citizen of the United States, residing at Swampscott, in the county of Essex, State of Massachusetts, have invented certain new and useful Improvements in Controlling Mechanism for Electric Vehicles and the like, of which the following is a specification.

The invention relates to electrically driven motor vehicles and the like, and particularly to those which are propelled by means of energy derived from storage batteries or other source of power carried on the vehicle. Controllers are ordinarily provided for controlling the vehicle driving motors, and with the controllers are associated switches which cut off the power to the motors. It is desirable for reasons well understood to disconnect the driving motors from the source of supply when the vehicle brakes are applied, and it is also desirable to prevent the application of power to the motors upon release of the brake until the controller is returned to the off position.

My invention relates to an improved arrangement whereby when the vehicle brakes are applied the motor cut-out switch is operated, and whereby the motor controller must be returned to the off-position before the cut-out switch can be closed by the release of the brakes.

For a better understanding of my invention, reference is had to the accompanying drawings, wherein Fig. 1 is a front view of my improved control arrangement with the front cover of the controller removed; Fig. 2 is a side view of the controller; Fig. 3 is an end view of the controller showing the various interlocking features between the controller, the motor cut-out switch and the brake rod; Fig. 4 is a simplified figure showing the position of the various parts of the interlocking mechanism when the brakes are applied, the cut-out switch is open and the controller is in the off-position; Fig. 5 is a similar view showing the manner in which the cut-out switch is closed upon the release of the brakes when the controller is in the off-position; and Fig. 6 is a similar view showing the position of the various parts when the vehicle brakes are applied and the controller is in a running position.

Referring to the drawings, the controller comprises a casing 10 within which is suitably mounted a shaft 11 on which various motor circuit controlling contacts are mounted, and the shaft 11 is operated by means of the controller handle 12 which is secured thereto. The cut-out switch 13 provided for opening up the connection from the source of supply to the vehicle motor or motors is of the hollow shaft 14 which in mounted on the extension of shaft 11 turn is mounted on the extension of shaft 11 so as to have relative rotation with respect thereto. The lower end of the shaft 11 and the shaft 14 are journaled in a support 15 secured in the bottom of the casing 10. Secured to the shaft 14 for the purpose of operating the switch 13 is a switch member 16 which is disposed on the outside of the casing 10.

The operating means for the member 16 comprises the rotatable member 17 which is disposed on the shaft 14 so as to have relative movement with respect to the switch 13 and the operating member 16, and which is adapted to be connected to or operated synchronously with the brake rod which applies the vehicle's brakes. The member 17 carries a pivoted dog or pawl 18 which is adapted to be moved out of engagement with the member 16 by means of the spring 19; that is, the pawl 18 is normally biased to a position by means of the spring 19 at which the connection between the member 16 and the operating member 17 is broken for returning the switch member 13 to circuit closed position when the controller handle 12 is in any operative position. The cam 20 is provided for moving the pawl 18 into engagement with the member 16 when the controller is in an off position so that when the brakes are released the connection between the operating member 17 and the member 16 is established and the switch 13 will be closed. This cam 20 is mounted on the shaft 21 which has secured thereto at its upper end a cam 22 which cooperates with the "star" wheel 23 secured to the shaft 11 in such a manner that when the controller is in an off position the cam 20 is in the position shown in Figs. 3, 4 and 5, and when the controller is in an operative position the cam 20 is in the position shown in Fig. 6 at which the pawl 18 is biased out of engagement with the member 16, so that when the brakes are released the return of the operating member 17 will cause the kicked-up end 24 to pass by the member 16 without returning this member and the switch 13 to the closed position. The arrangement of the parts for this condition is shown in Fig. 6.

A projection 25 on the operating member 17 engages the member 16 to move the cut-out-switch to the open position when the brakes are applied. The cut-out switch is opened quickly by means of the spring 26 which has one of its ends secured to the controller casing and the other end secured to a post 27 connected to the switch member 16. The arrangement is such that when the switch member 16 has been moved a certain angular distance by the projection 25 on the operating member 17, the switch member is moved over center and will be rotated clockwise quickly to its final open position by means of the spring 26. A quick action switch of very simple construction is thereby provided. The stop 28 secured to the casing 10 is provided for limiting the travel of the switch member 16 in the open position. A spring 29, having one of its ends connected to a post on the left hand end of the strap 30 and its right-hand end connected to the shaft 21, is provided for flexibly mounting the shaft 21. This shaft passes through an aperture in the right hand end of the strap 30 and also through an aperture in the bottom of the switch casing. These apertures are made slightly larger than the diameter of the shaft in order to provide a clearance for the pawl 18 to pass the point of cam 20 at the time the latter is opposite the pivot of the pawl. The clearance and the spring 29 provide a certain flexibility which is desirable to allow the return of the pawl without producing any undue stresses on the mechanism.

As thus constructed and arranged, and with the parts in the various positions shown in Figs. 1, 2 and 3, when the brake pedal 31 is depressed the operating member 17 is rotated clockwise until the projection 25 engages the switch member 16. A continuation of this movement throws the post 27 off center with respect to the shaft 14 and the lower end of the spring 26 so that the switch member 16 will be rotated quickly to its final open position, thereby opening the switch 13 quickly. It will be understood that the clockwise rotation of the operating member 17 carries with it the pawl or pivoted dog 18 so that when the brakes are applied the position of the various parts will be as shown in Fig. 4. Assume now that the controller handle 12 has been returned to the off-position, the "star" wheel 23 will be rotated to such a position that the cam 22 will rotate the shaft 21 and with it the cam 20 clockwise to the position shown on Fig. 4. The rotation of the member 16 to the open position is arrested by means of the stop 28 secured to the casing 10. When the brakes are released the operating member 17 is rotated counter-clockwise until the pawl 18 makes engagement with the switch member 16, and when this happens the pawl will be frictionally held in engagement therewith so that the switch 13 will be returned to the closed position. The position of the various parts will then be as shown in Figs. 1, 2 and 3. Fig. 5 shows the relation of the various parts when the operating member 17 has been rotated counter-clockwise to the position at which the pawl 18 engages the switch member 16 and has rotated the switch member a small angular distance toward the closed position.

Assume that the brakes are applied with the controller in an operative or running position. The cam 20 will be moved out of engagement with the upper end of the pawl 18, and this pawl will be permitted to assume the position shown in Fig 6. If the brakes are now released, the kicked-up end 24 of the pawl will pass by the switch member 16 and the switch 13 will remain opened. In order to return the switch 13 to the closed position it will be necessary to return the controller handle 12 to the off-position, thereby rotating the cam 20 and moving the upper end of the pawl 18 against the bias of the spring 19, so that when the operating member 17 is returned upon the release of the brakes, a connection between the operating member 17 and the switch member 16 is established for returning the switch 13 to the closed position, as explained in connections with Figs. 4 and 5.

It will be observed by those skilled in the art that my invention has features of simplicity of construction and reliability of operation which render it effective for the service to which apparatus of this nature is ordinarily subjected.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination with a motor controller of a switch movable with respect thereto for controlling the motor, a brake rod for mechanically operating the switch from and to an operative position, and means whereby the brake rod is rendered inoperative in returning the switch to the operative position unless the controller is in a predetermined position.

2. The combination with a motor controller of a switch movable with respect thereto for controlling the motor, a brake rod for mechanically operating the switch from and to an operative position, and mechanical connections between the brake rod, the switch and the controller whereby the brake rod is rendered inoperative in returning the switch to the operative position unless the controller is in a predetermined position.

3. The combination with a motor controller of a normally closed switch in the motor circuit, operating means therefor, a brake rod, and connections between the brake rod and the operating means comprising a rotary member which engages with the operating means to open the switch when the brake is applied, a pivoted dog carried by the rotary member which engages the operating means to return the switch to closed position, and means whereby the said dog is rendered ineffective, in case the motor controller is in any operative position.

4. The combination with a motor controller of a switch for controlling the motor, a brake, means adapted to connect the switch and the brake comprising a member adapted to be operated with the brake for operating the switch in one direction, the said member carrying a movable part biased out of operative relation with the switch for returning the switch to the original position upon the release of the brake, and means operated by the controller for moving the said part against its bias into operative relation with the switch only when the controller is in the off-position.

5. The combination with a motor controller of a switch movable with respect thereto for controlling the motor, a brake rod, operating means for the switch controlled by the brake rod and having relative movement with respect to the switch for moving the switch from and to an operative position, and connections between the switch rod, the operating means and the controller whereby the brake rod is rendered inoperative in returning the switch to the operative position in case the controller is in any position but the off-position.

6. The combination with a motor controller of a normally controlled switch in the motor circuit, operating means for the switch arranged to open the switch quickly when moved past a dead center position, a brake rod, cooperating with the operating means to open and close the switch, and a member adapted to establish mechanical connections between the brake rod, the operating means and the controller only when the controller is in the off position, whereby the switch cannot be closed by the operation of the brake rod unless the controller is in the off-position.

7. The combination with a motor controller having a shaft carrying motor controlling contact mechanism, a normally closed switch in the motor circuit on the said shaft movable with respect to the shaft, operating means for the switch on the said shaft movable with respect to the switch, a brake rod connected to the operating means for opening the switch when the brakes are applied, a pivoted member carried by the operating means biased out of operative relation with the switch for closing the switch responsively to the release of the brakes, and means whereby the said pivoted member is moved into operative relation with the switch only when the controller is in the off position.

8. The combination with a motor controller having a shaft carrying motor control contact mechanism, a normally closed switch in the motor circuit on the said shaft movable with respect to the shaft, operating means for the switch on the said shaft movable with respect to the switch, a spring for opening the switch quickly when the switch is moved past a dead center position, a brake rod connected to the operating means for opening the switch when the brakes are applied, a pivoted dog carried by the operating means for closing the switch responsively to the release of the brakes, a spring for biasing the said dog out of operative relation with the switch, and a cam operated by the controller only in the off position of the controller for moving the said dog into operative relation with the switch, whereby the switch is closed by the operation of the brake rod only when the controller is in the off position.

In witness whereof, I have hereunto set my hand this 31st day of March, 1921.

PAUL E. TWISS.